(12) United States Patent
Fukuyoshi

(10) Patent No.: US 6,507,484 B2
(45) Date of Patent: Jan. 14, 2003

(54) DISPLAY DEVICE WITH MODULE HAVING FRONT AND BACK COVER

(75) Inventor: Hirokazu Fukuyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 17 days.

(21) Appl. No.: 09/836,507

(22) Filed: Apr. 18, 2001

(65) Prior Publication Data

US 2001/0036057 A1 Nov. 1, 2001

(30) Foreign Application Priority Data

Apr. 19, 2000 (JP) .................................. 2000-118454

(51) Int. Cl.[7] .......................... G06F 1/16; G02F 1/1333
(52) U.S. Cl. ...................................... 361/681; 345/156
(58) Field of Search ................................ 361/681, 683; 349/58, 59; 345/156, 905

(56) References Cited

U.S. PATENT DOCUMENTS 5,570,267 A * 10/1996 Ma .............................. 361/681
5,905,550 A * 5/1999 Ohgami et al. ............... 349/58
6,362,860 B1 * 3/2002 Sagawa ......................... 349/59
6,411,359 B1 * 6/2002 Kobayashi et al. .......... 349/149
6,411,504 B2 * 6/2002 Howell et al. ............... 361/683

* cited by examiner

*Primary Examiner*—Lynn D. Feild
(74) *Attorney, Agent, or Firm*—Young & Thompson

(57) ABSTRACT

The present invention provides a display device and information terminal device wherein the installation of the display module is simple and the number of parts reduced, and that exhibits strength towards shocks. A projection 11 projecting towards a back cover 5 is provided on a front cover 6, a hole 12 into which the projection 11 is inserted is provided in a liquid crystal module 4, and at the same time, a hook 13 is provided that, while pressing the projection 1 inserted into the hole 12, deforms towards the back cover 5 due to the insertion of the projection 12, and a recess 14 is provided that engages the hook 13 that has been deformed by the insertion of the projection 11. When the front cover is placed on and aligned with the back cover and the projection 11 is inserted into the hole 12, the liquid crystal module 4 is anchored to the back cover by the hook 13 engaging in the recess 14, and the front cover 6 is anchored to the liquid crystal module 4 by the projection 11 being sandwiched between the hook 13 and the chassis 8.

13 Claims, 11 Drawing Sheets

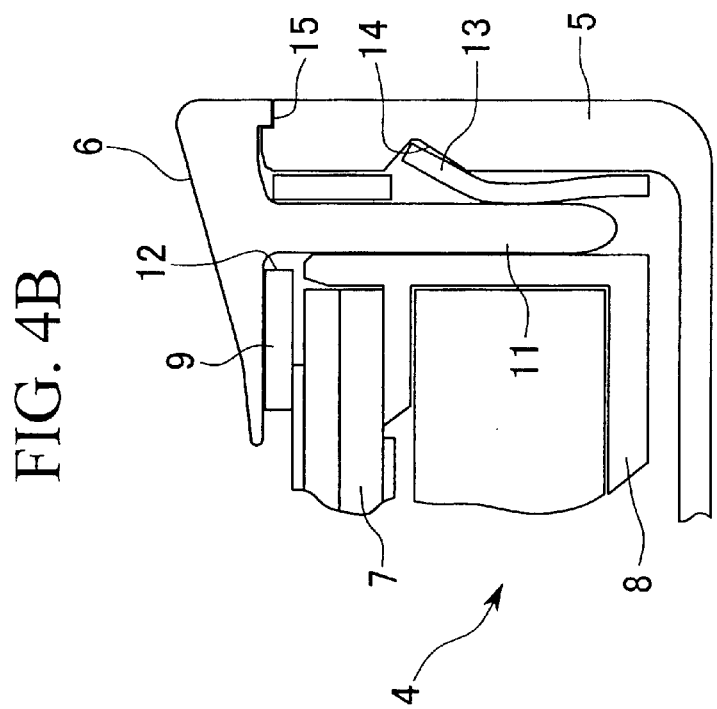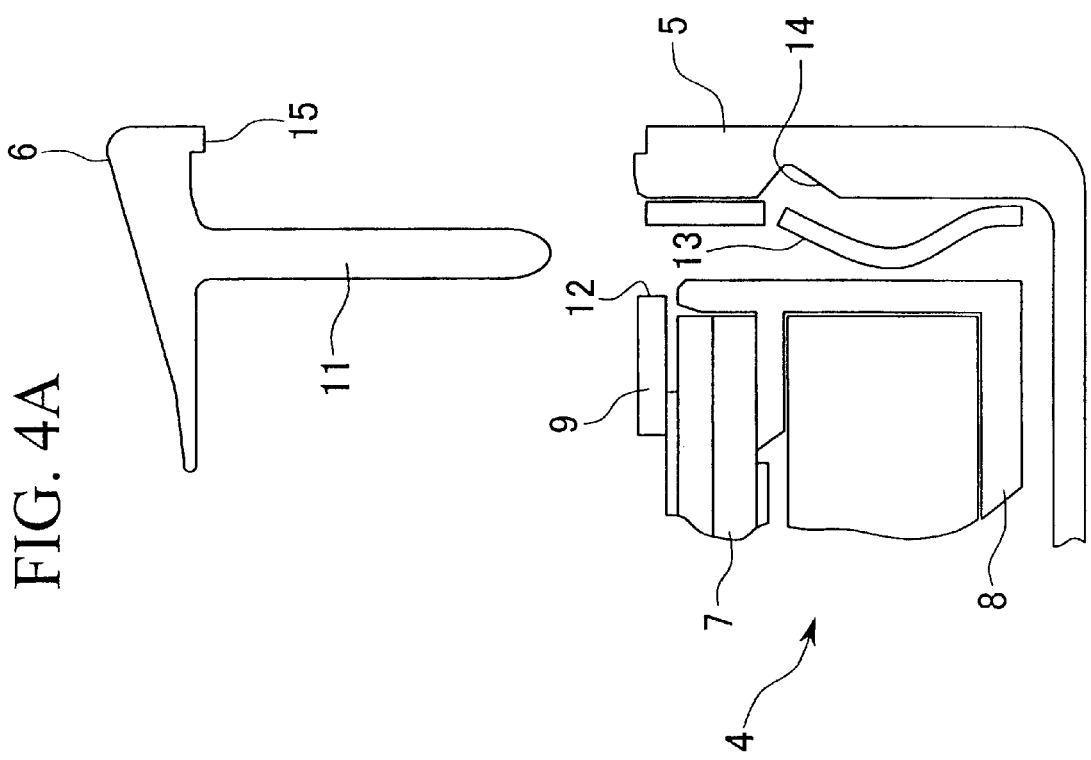

DISPLAY DEVICE WITH MODULE HAVING FRONT AND BACK COVER

BACKGROUND OF THE INVENTION

1. Field of the Invention

The present invention relates to a display device and an information terminal apparatus providing a display module such as a liquid crystal module.

2. Description of the Background Art

In an information terminal apparatus such as a notebook personal computer, the lid body mounted so as to cover the body of the computer itself serves as the display device. This display device is formed by a crystal liquid module being anchored to the inside of the body serving as the case of the lid body.

Examples of the retaining structure for a liquid crystal module in the body are shown in FIGS. 16A and 16B. In the two retaining structures shown in the figures, a screw is used in both as a means to anchor the liquid crystal module. First, in FIG. 16A, a boss part 27 projects perpendicularly relative to the bottom surface in the back cover 26 that forms the body, and at the same time a screw hole 28 is formed in the boss part 27, an overhanging part 30 is formed that overhangs in the sideways direction on the side edge of the liquid crystal module 29, a through hole 31 is formed so as to conform to the screw hole 28 in the overhanging part 30 when the liquid crystal module 29 is disposed inside the back cover 26, and the liquid crystal module 29 is anchored in the back cover 26 by screwing the screw 32 into the screw hole 28 through the through hole 31. Moreover, in addition to the back cover, the front cover 33 that forms the body is anchored to the back cover 26 by another retaining device (not illustrated).

In FIG. 16B, a screw hole 35 is formed parallel to the display surface on the side edge of the liquid crystal module 34, a through hole 37 is formed on the side wall of the back cover 36 so as to conform to the screw hole 35 when the liquid crystal module 34 is disposed inside the back cover, and the liquid crystal module 34 is anchored to the back cover 36 by screwing the screw 38 into the screw hole 35 via the through hole 37. Moreover, in this retaining structure as well, the front cover 39 is anchored to the back cover 36 by another retaining device (not illustrated).

In the case of using a screw as a means to anchor the liquid crystal module as described above, there are such problems as the operation of screwing the screws being labor consuming and appropriately maintaining the torque for tightening the screw being difficult. In addition, in a laptop personal computer and the like, in order to design a thin frame for the body, special tools are used for the necessarily extremely small screws, and this is also a cause of the screwing operation of the screw consuming labor.

Furthermore, in order to increase the workability of the back cover, a screw hole is formed by inserting a female screw for insertion in the boss part, and in this case, there are the problems that the number of parts increases and the cost increases.

In addition, in the case of the retaining structure in FIG. 16A, a space for fitting screws between the side edge of the liquid crystal module and the side wall of the back cover is necessary, and this works against improving the thinness of the frame of the body. In addition, when a female screw for insertion is used, the female screw for insertion may fall out of the boss part when a shock is applied to the body.

In the case of the retaining structure in FIG. 16B, maintaining an appropriate space between the side edge of the liquid crystal module and the side wall of the back cover is difficult. In addition, carrying out the screwing operation is difficult due to having to align the screw position of the screw with the edge surface part of the body.

SUMMARY OF THE INVENTION

In consideration of the above described problems, it is an object of the present invention to provide a display device and an information terminal device in which this display device is mounted that simplifies installation of the display module, reduces the number or parts, allows design of a thinner frame, and exhibits greater shock resistance.

The following devices are used in order to solve the above-described problems. Specifically, the display device according to a first aspect of the present invention is a display device in which the display module is disposed and anchored between the front cover and back cover, wherein a projection that projects towards the back cover is provided on the front cover, a hole is provided on the display module into which the projection is inserted when anchored between both covers, and at the same time, a hook is provided that is deformed towards the back cover by inserting the projection while pressing the projection being inserted into the hole, and a recess is provided on the back cover into which the deformable hook engages by the insertion of the projection.

In this display device, first when the display module is disposed inside the back cover and the projection is inserted in the hole so that the front cover is placed over and aligned with the back cover, the projection abuts the hook, the projection is pressed by the hook to become sandwiched between the hook and one part of the display module, and at the same time, the hook is deformed towards the back cover to fit into and engage the recess. The display module is anchored to the back cover by the hook engaging in the recess, and the front cover is anchored to the display module by being sandwiched between the hook and the display module.

In the above display device, the hook is provided on a shielding frame that forms the display module.

The shielding frame is provided so as to serve as the side edge of the display module which blocks electromagnetic waves. In this display device, by providing a hook on the shielding frame, both can be anchored by using the space between the display module and the back cover.

In the above display device, the hook is formed by cutting and raising a part of the shielding frame.

In this display device, by forming the hook by cutting and raising a part of the shielding frame, the flexibility required of the hook can be guaranteed, and the members designed so as to be integrally formed.

In the above display, a first engagement part that engages the projection inserted in the hole is provided in the shielding frame.

In this display device, the first engagement part provided on the shielding frame firmly anchors the front cover to the shielding frame, that is, the display module, by engaging the projection that has been inserted in the hole.

In the above display device, the first engagement part is provided at a location that abuts the projection of the hook.

In this display device, the first engagement part, provided at a location that abuts the projection of the hook, is pressed against the projection due to the pressing force of the hook, and thereby the front cover is more firmly anchored to the display module.

In the above display device, the first engagement part is provided in the hole.

In this display device, the first engagement part provided in the hole engages the projection, and thereby the front cover is more firmly anchored to the display module.

In the above display device, the first engagement part is provided more forward in the insertion direction of the projection than the hook.

In this display device, the first projection provided more forward in the insertion direction of the projection than the hook engages the projection, and thereby the front cover is more firmly anchored in the display module.

In the above display device, a second engagement part that engages the liquid crystal module is provided on the projection.

In this display device, the second engagement part is provided on the projection engaging the liquid crystal module, and thereby the front cover is more firmly anchored to the display module.

In the above display device, a first roughened surface processed part is provided on at least one of the projection or the hook to increase the friction between both at the location where the one abuts the other.

In this display device, the first roughened surface processed part provided on at least one of the projection or hook increases the friction between both at the location where the projection and the hook abut each other, and thereby the front cover is more firmly anchored to the display module.

In the above display apparatus, a second roughened surface processed part is provided on at least one of the hook or the back cover to increase the friction between both at the location where the one abuts the other.

In this display device, the second roughened surface processed part provided on at least one of the hook or back cover increases the friction between both at the location where the hook and the back cover abut each other, and thereby the display module is more firmly anchored to the back cover.

In the above display device, the first engagement part is provided to engage the front cover in the back cover and prevent the forward deformation of the back cover.

In this display device, the engagement part provided on the front cover engages the back cover, and thereby forward deformation of the back cover is prevented.

The above display device provides a plurality of retaining structures for anchoring the display module between both covers by the projection, the hole, the hook, and the recess, and the retaining structures can be disposed separated along the side edge of the display module.

In this display device, the retaining structures for anchoring the display module between both covers are disposed separated along the side edge of the display module, and thereby the display module is stabilized and firmly anchored between both covers.

The present invention provides an information terminal device which is provided with the above-described display device.

The above-described display device simplifies the installation of the display module, decreases the number of parts, and increases the strength of the shock resistance by providing the independent structures described above, and thereby attains the same effect in the information terminal device providing this display device.

BRIEF DESCRIPTION OF THE DRAWINGS

FIG. 4A and FIG. 4B are drawings for explaining the state showing the method of operating the retaining structure for assembling the display device.

DETAILED DESCRIPTION OF THE INVENTION

The first embodiment of the present invention will be explained referring to FIG. 1 through FIG. 4.

Figure 1:
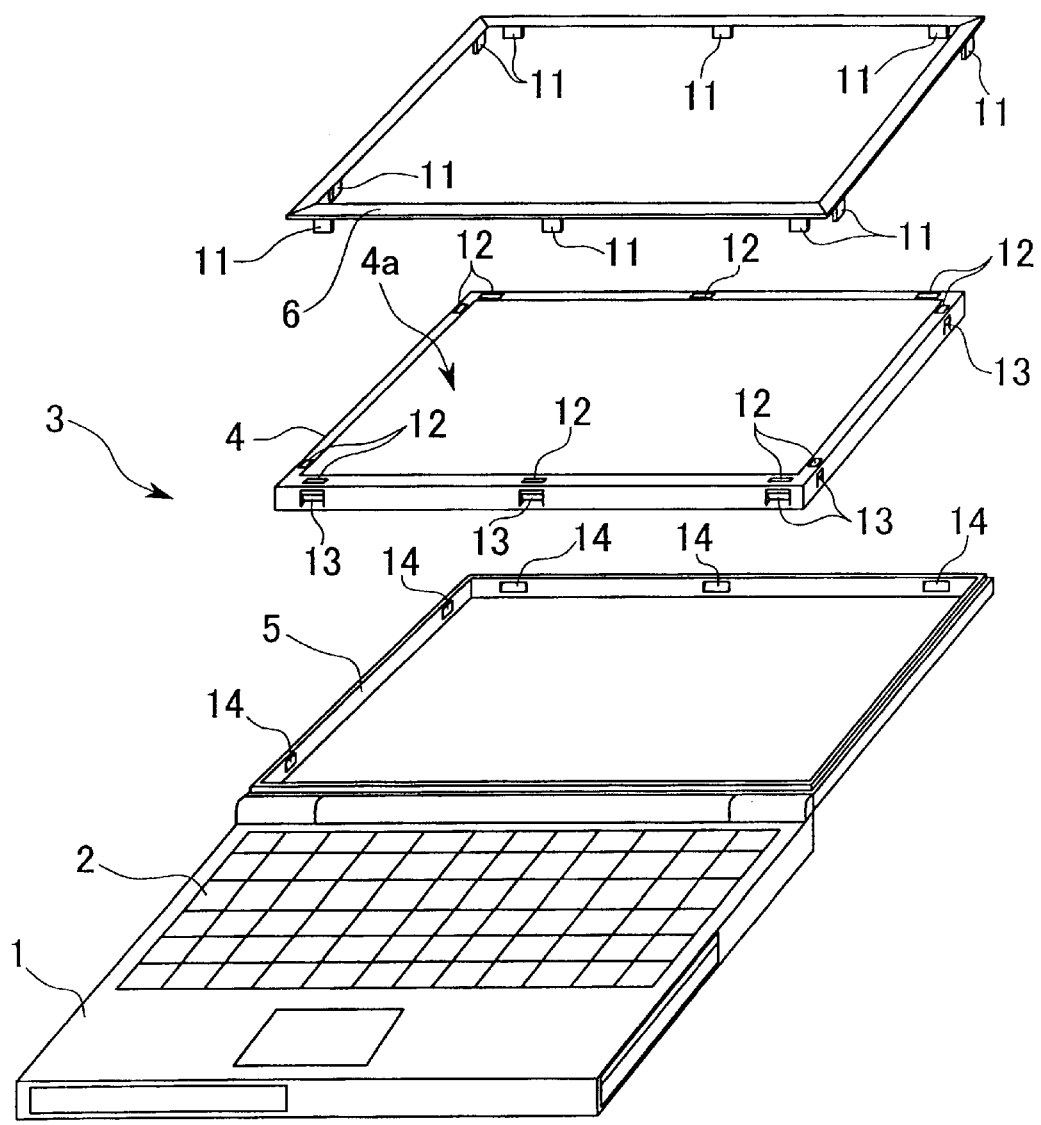
FIG. 1 is a drawing showing the first embodiment of the present invention, and is a partial perspective drawing of a note-type personal computer that is an example of an information terminal device.

FIG. 1 shows a note-type personal computer, which is an example of the information terminal device according to the present invention. In the figure, reference numeral 1 is the body of a note-type personal computer, reference numeral 2 is the input part provided in the body 1, and reference numeral 3 is a lid that covers the input part 2. The liquid crystal module (display module) is build into the lid 3, and serves as the display device that displays the content of the activities in the body 1.

The liquid crystal module 4 is anchored by being sandwiched between the back cover 5, which is positioned under the back surface of the display surface 4a, and the front cover 6, which is disposed along the periphery of the display surface 4a. Both the back cover 5 and the front cover 6 are made of synthetic resin (or aluminum, magnesium alloy, or other metal).

Figure 2:
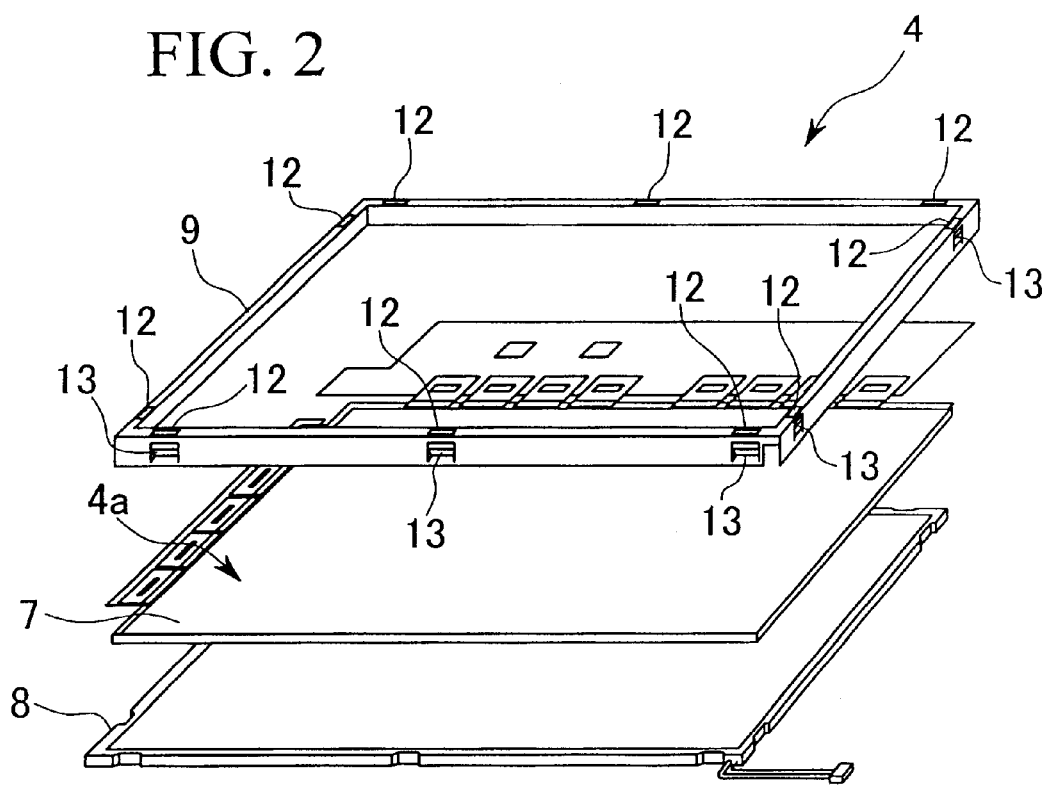
FIG. 2 is a partial perspective drawing of the liquid crystal module shown in FIG. 1.

The structure of the liquid crystal module 4 is shown in FIG. 2. In this figure, reference numeral 7 is an LCD (liquid crystal display) panel, reference numeral 8 is a chassis having a back light unit that is built-in, and reference numeral 9 is a shielding frame.

In the liquid crystal module 4, the LCD panel 7 and the chassis 8 are disposed by aligning their four corners, the shielding frame 9 is placed on the display surface 4a side, and the three essential structural elements are integrated by the side edge of the chassis 8 being held by a spur (not illustrated) formed on the shielding frame 9 so as to be gripped.

Returning to FIG. 1, on the liquid crystal module 4, the back cover 5, and the front cover 6, retaining structures that anchor the liquid crystal module 4 between both covers are provided. These retaining structures comprise a projection 11 provided on the front cover 6 side, the hole 12 and hook 13 provided on the liquid crystal module 4 side, and a recess 14 provided on the back cover 5 side, and when the lid 3 is seen in a plan view, these are provided on the liquid crystal module 4 at three locations on both ends and the center of the top and bottom of the side edge and two locations on the top and bottom of the side edges on the left and right, for a total of 8 locations.

The projection 11 is integrally formed with the front cover 6, and is provided so as to project towards the back cover 5 when the front cover 6 and the back cover 5 are opposite to each other.

Figure 3:
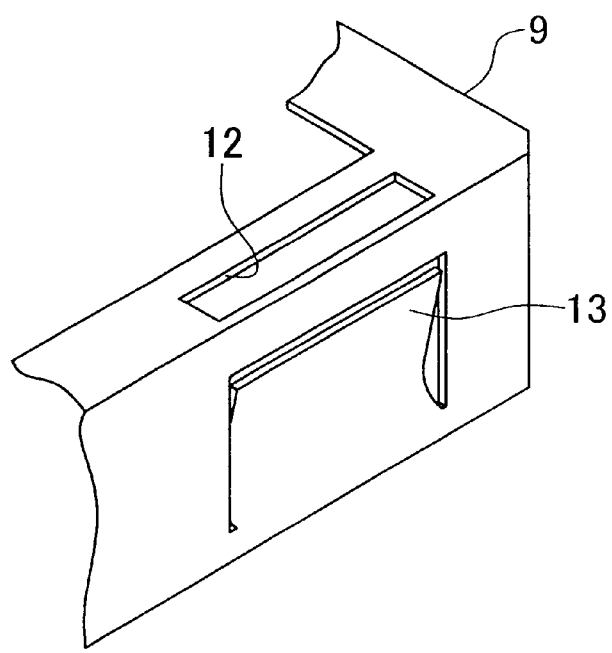
FIG. 3 is a perspective drawing showing the essential elements of the shielding frame that forms the retaining structure of the liquid crystal module.

The hole 12 is formed by being cut into the shielding frame 9 as shown in FIG. 3, and the projection 11 becomes inserted when the liquid crystal module 4 is anchored between the back cover 5 and the front cover 6.

The hook 13 formed by cutting one part of the shielding frame 9, and bending this part into a tilted-L shape when viewed in cross-section, and when the projection 11 is inserted, the back part is pressed, and the distal end is deformed towards the back cover 5 side. The recess 14 is formed at a position where the distal end of the hook 13, which is deformed towards the back cover 5 side by the insertion of the projection 11, fits.

In addition, the back cover 5 and the front cover 6 are fit together without a gap along the entire periphery at the outer edge to form the body serving as the case of the lid 3. However, on the fitting surface of the back cover 5 side, a step is formed that is high on the inside and low on the outside, and on the fitting end surface of the front cover side 6, an engagement part 15 having a clasp shape in cross-section is formed that engages the step of the back cover 5 side (refer to FIG. 4).

In the display device structured as described above, the method of operation of the retaining structure during its assembly is explained referring to FIG. 4.

First, as shown in FIG. 4A, the liquid crystal module 4 is disposed inside the back cover 5, and next when the projection 11 is inserted into the hole 12 so that the front cover is placed over and aligned with the back cover 5, the distal end of the projection 11 abuts the hook 13. When the projection 11 is further inserted resisting the flexibility of the hook 13, as shown in FIG. 4B, the projection 11 is sandwiched between the hook 13 and the chassis 8 by the back of the hook 13 pressing on the side surface of the projection 11, and at the same time, the hook 13 is flexibly deformed towards the back cover 5 side, and its distal end is fit into the recess 14.

The liquid crystal module 4 is anchored in the back cover 5 by the distal end of the hook 13 fitting into and engaging the recess 14, and the front cover is anchored to the liquid crystal module 4 by the projection 11 being sandwiched between the hook 13 and the side surface of the chassis 8. Thereby, the liquid crystal module 4 becomes anchored between the front cover 6 and the back cover 5.

According to the above-described display device, the installation operation of the liquid crystal module 4 is simplified, and at the same time, the number of parts can be decreased. In addition, because screws are not used, as is the case conventionally, the problem of the scratches produced by screws penetrating into the liquid crystal module 4 and the damage to the display performance can be avoided.

By providing a hook 13 on the shielding frame 9 made of metal to serve as the side edge of the liquid crystal module 4, both can be anchored by using the space between the liquid crystal module 4 and the back cover 5, and thus the display device can be made thinner.

By forming the hook 13 by cutting one part of the shielding frame 9, the flexibility required from the hook 13 can be guaranteed, and integral formation of the members can be implemented. Thereby, the production cost can be reduced.

The engagement part 15 provided on the front cover 6 is engaged with the back cover 5, and thereby, forward deformation of the back cover 5 is prevented, and thus the precision of the assembly of the display device can be increased.

The retaining structures of the liquid crystal module 4 can be disposed separated along the side edge of the liquid crystal module 4, and thereby the liquid crystal module 4 is stabilized between both covers and firmly anchored. Thus, the durability of the display device itself can be improved.

Furthermore, for a note-type personal computer furnished with the above-described display device, because the installation of the liquid crystal module is simplified and the number of parts is reduced, the production cost can be reduced. In addition, shock resistance can be strengthened, and high durability attained.

It is noted that in the present embodiment, the protrusion 11 is integrally formed with the front cover, but a structure is possible in which the nail-shaped protrusion 11 is provided separately from the front cover 6, a hole is formed in the front cover 6, and the protrusion is inserted into the hole after positioning and aligning the liquid crystal module 4, the back cover 5, and the front cover 6.

In addition, in the present embodiment, the hook 13 is formed by cutting one part of the shielding frame 9, but a structure is possible in which the hook 13 is made a separate part, and anchored to the shielding frame 9.

Figure 5:
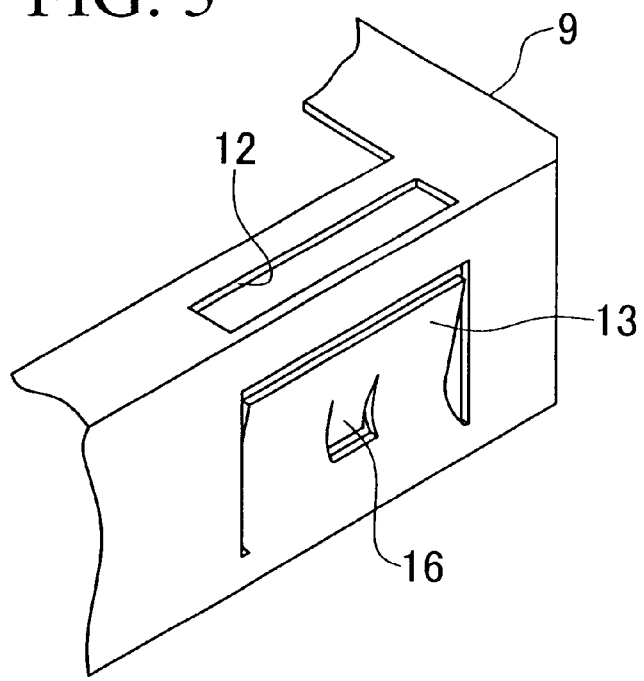
FIG. 5 is a drawing showing a second embodiment of the present invention, and is a perspective drawing showing the essential elements of the module frame that forms the retaining structure of the liquid crystal module.
Figure 6:
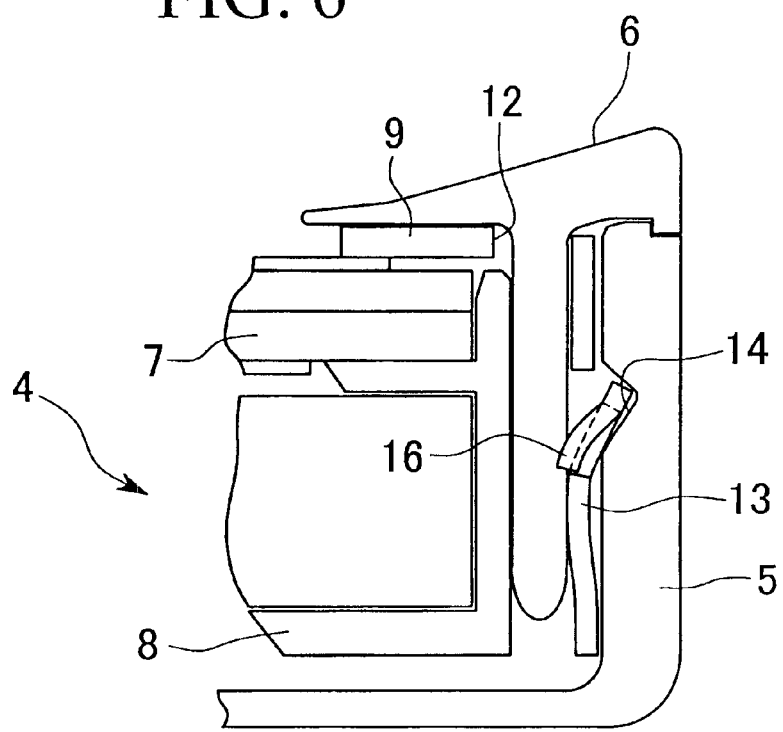
FIG. 6 is a cross-sectional drawing showing the retaining structure of the liquid crystal module furnished with the shielding frame shown in FIG. 5.

Next, the second embodiment of the present invention is explained referring to FIG. 5 and FIG. 6. Moreover, essential components of the structure that have already been explained in the above-described first embodiment have identical reference numerals, and the explanation thereof has been omitted.

In this embodiment, in the shielding frame 9 a spur (first engagement part) 16 that engages the protrusion 11 inserted in the hole 12 is provided. This spur 16 is formed by cutting a part of the hook 13 on the back part thereof that abuts with the protrusion 11.

In the case of the present embodiment, when the protrusion 11 is inserted into the hole 12, as shown in FIG. 6, the spur 16 presses against the protrusion 11 assisted by the elasticity of the hook 13. The pressed spur 16 is strongly held against the side surface of the synthetic resin protrusion 11, and engaged with the protrusion 11.

According to the display device of the present embodiment, the spur 16 presses against the protrusion 11 due to the pressing force of the hook 13, and thereby the front cover 6 is more firmly anchored in the liquid crystal module 4. Thus, the retaining structure of the liquid crystal module 4 is a simple structure that at the same time provides high reliability.

Below, another embodiment resembling the present embodiment is shown.

Figure 7:
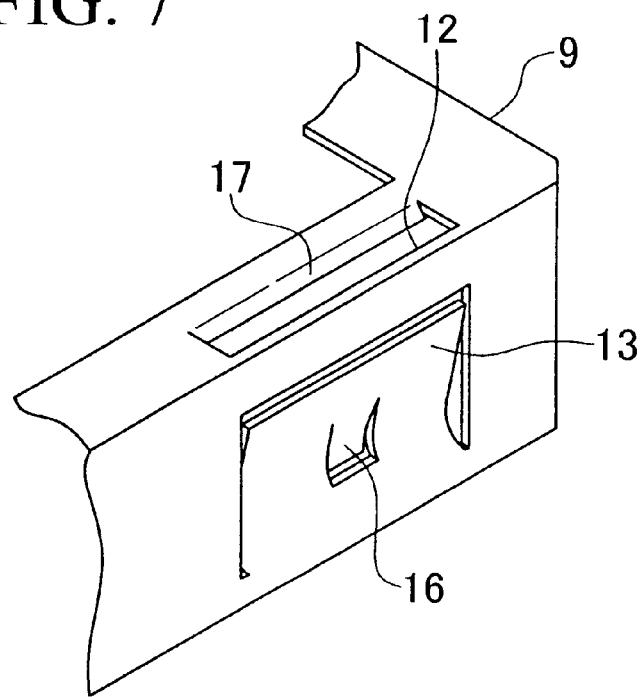
FIG. 7 is a drawing showing another embodiment similar to that of the second embodiment, and is a perspective drawing showing the essential elements of the shielding frame that forms the retaining structure of the liquid crystal module.
Figure 8:
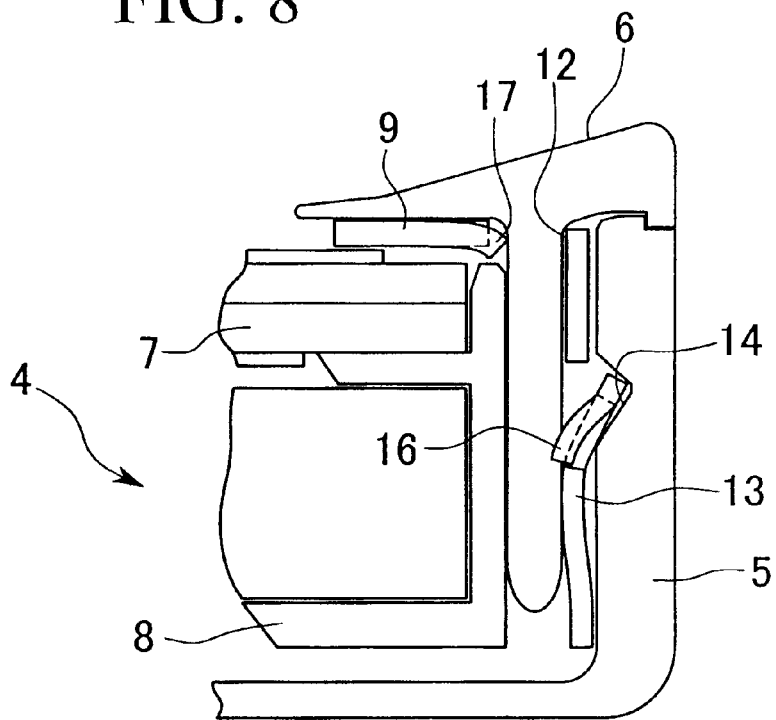
FIG. 8 is a cross-sectional drawing showing a retaining structure of the liquid crystal module furnished with the shielding frame shown in FIG. 7.

In the embodiment shown in FIG. 7 and FIG. 8, a spur 17 is also provided on the edge part of the hole 12. When the hole 12 is formed, the spur 17 is formed so as to leave a part of the shielding frame 9 and bend downward.

In the case of this embodiment, when the protrusion 11 is inserted into the hole 12, as shown in FIG. 8, the spur 16 is pressed against the protrusion, and at tie same time, the spur 16 is strongly held similarly because the distal end of the spur 17 presses against the base of the protrusion 11 to engage the protrusion 11. Thereby, the front cover 5 is more firmly anchored to the liquid crystal module 4, and thus the retaining structure of the liquid crystal module 4 is a simple structure that at the same time provides high reliability.

Figure 9:
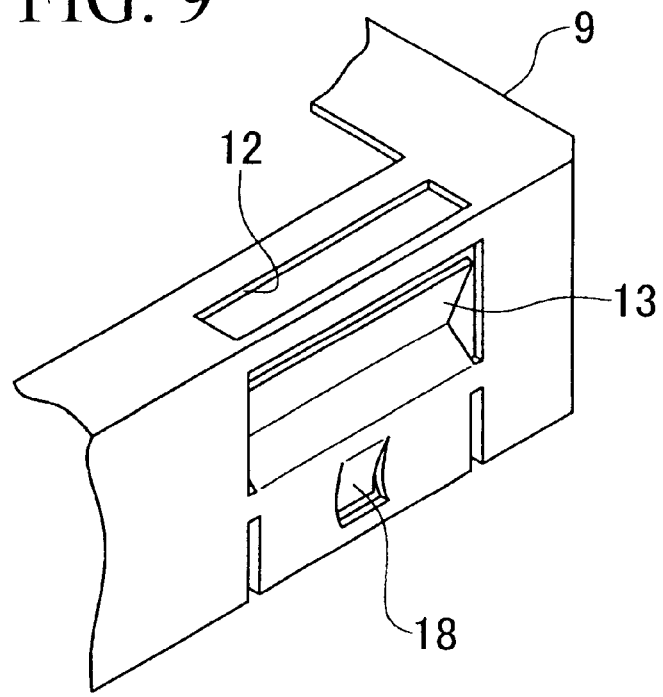
FIG. 9 is a drawing showing another embodiment similar to the second embodiment, and is a perspective drawing showing the essential elements of the shielding frame that forms the retaining structure of the liquid crystal module.
Figure 10:
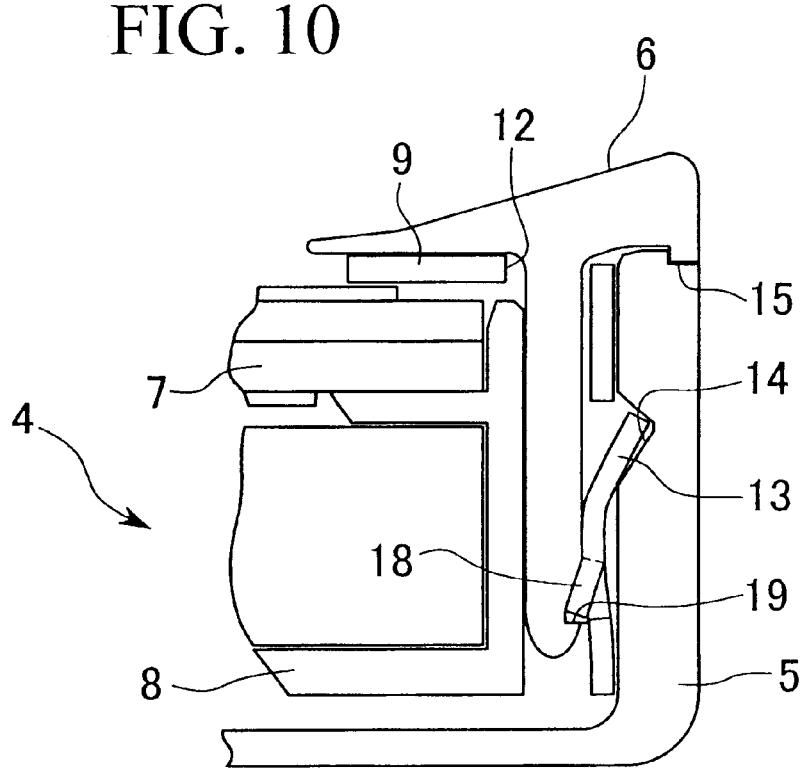
FIG. 10 is a cross-sectional drawing showing the retaining structure of the liquid crystal module furnished with the shielding frame shown in FIG. 9.

In the embodiment shown in FIG. 9 and FIG. 10, the spur 18 is provided more forward in the insertion direction of the projection 11 than the hook 13. Like the hook 13, the spur 18 is formed by cutting one part of the shielding frame 9. In addition, a recess 19 is formed on the distal end of the projection 11 coinciding with the spur 18.

In the case of this embodiment, when the projection 11 is inserted into the hole 12, as shown in FIG. 10, the projection 11 is sandwiched between the hook 13 and the side surface of the chassis 8, and the spur 18 fits into the recess 18 due to the elasticity of the hook 13 to engage the projection 11. Thereby, because the front cover is also more firmly anchored to the liquid crystal module 4, the retaining structure of the liquid crystal module 4 is a simple structure, and yet at the same time, has a high reliability. Moreover, as shown in the embodiment in FIG. 7, the distal end of the spur 18 can be strongly held by the projection 11, without providing a recess 19.

Figure 11:
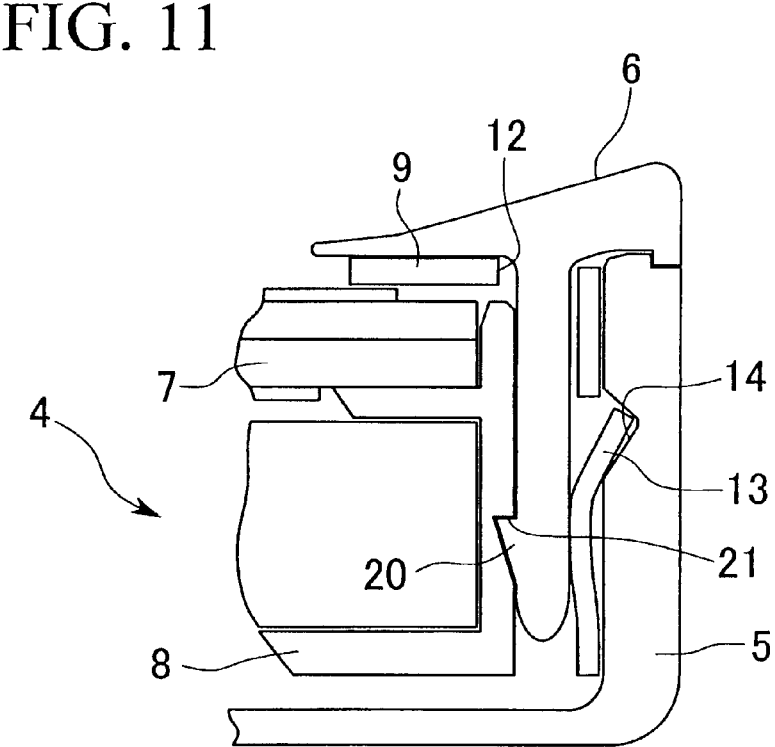
FIG. 11 is a drawing showing another embodiment similar to the second embodiment, and is a cross-sectional drawing showing the retaining structure of the liquid crystal module.

In the embodiment shown in FIG. 11, a spur (second engagement part) 20 that penetrates the chassis 8 side is provided on the surface of the protrusion 11. The spur 20 is integrally formed with the projection 11. In addition, a recess 21 is formed on the chassis 8 coinciding with the spur 20.

In the case of this embodiment, when the projection 11 is inserted into the hole 12, as shown in FIG. 11, the projection 11 is sandwiched between the hook 13 and the side surface of the chassis 8, and at the same time, the spur 20 fits into the recess 21 on the chassis 8 side, and is engaged with the chassis 8. Thereby, because the front cover 6 is also more firmly anchored to the liquid crystal module 4, the retaining structure of the liquid crystal module 4 is a simple structure, and yet at the same time, has a high reliability.

Figure 12:
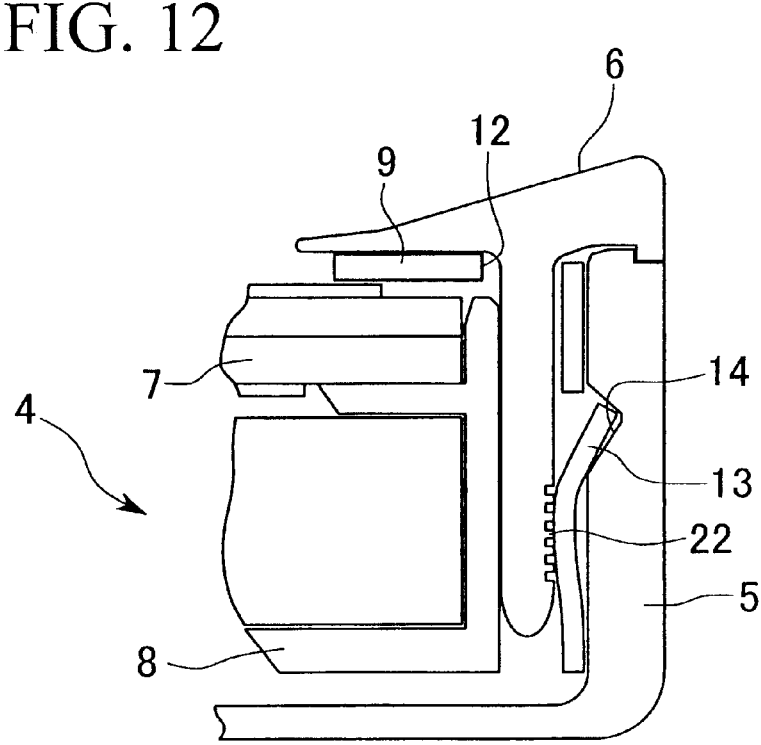
FIG. 12 is a drawing showing a third embodiment of the present invention, and is a cross-sectional drawing showing the retaining structure of the liquid crystal module.

Next, the third embodiment of the present invention will be explained referring to FIG. 12. Moreover, essential structural elements already explained in each of the above-described embodiments have identical reference numbers, and their explanation is omitted.

In this embodiment, at locations on the side surface of the projection 11 abutted against the hook 13, a roughened surface processed part (first roughened surface processed part) 22 is provided. The roughened surface processed part 22 has fine bumps formed on the surface, and is implemented using processing technology such as diamond knurl processing.

In the case of this embodiment, when the projection 11 is inserted into the hole 12, at the locations where the roughened surface processed part 22 abuts the hook 13, the friction therebetween is increased, and thereby, the front cover 6 is more firmly anchored to the liquid crystal module 4. Thereby, the retaining structure of the liquid crystal module 4 is a simple structure, and yet at the same time, has a high reliability.

In this embodiment, the roughened surface processed part 22 is provided on the projection 11, but instead, the roughened surface processed part 22 can be provided on the hook 13, or can be provided on both the projection 11 and the hook 13. In addition, technologies for implementing the roughened surface processing other than diamond cutting processing can be suitably selected.

Figure 13:
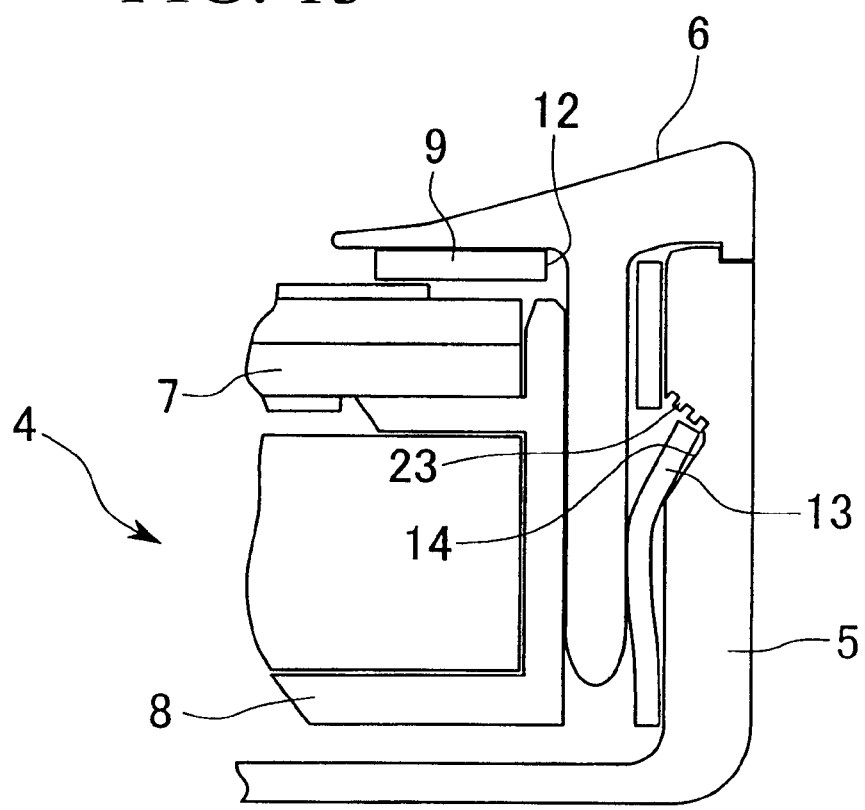
FIG. 13 is a drawing showing a fourth embodiment of the present invention, and is a cross-sectional drawing showing the retaining structure of the liquid crystal module.

Next, a fourth embodiment of the present invention will be explained referring to FIG. 13. Moreover, essential structural elements already explained in each of the above-described embodiments have identical reference numbers, and their explanation is omitted.

In this embodiment, at locations in the recess 14 abutting the hook 13, a roughened surface processed part (second roughened surface processed part) 23 is provided. Like the roughened surface processed part 22, the roughened surface processed part 23 is formed on the surface with fine bumps.

In the case of this embodiment, when the projection 11 is inserted into the hole 12, at locations where the roughened surface processed part 23 abuts the hook 13, the friction therebetween is increased, and thereby, the front cover 6 is more firmly anchored to the back cover 5. Thereby, the retaining structure of the liquid crystal module 4 is a simple structure, and yet at the same time, has a high reliability.

In this embodiment, the roughened surface processed part 23 is provided on the back cover 5, but instead, the roughened surface processed part 23 can be provided on the hook 13, or can be provided on both the back cover 5 and the hook 13.

Next, a fifth embodiment of the present invention will be explained referring to FIG. 14, FIG. 15A, and FIG. 15B. Moreover, essential structural elements already explained in each of the above-described embodiments have identical reference numbers, and their explanation is omitted.

Figure 14:
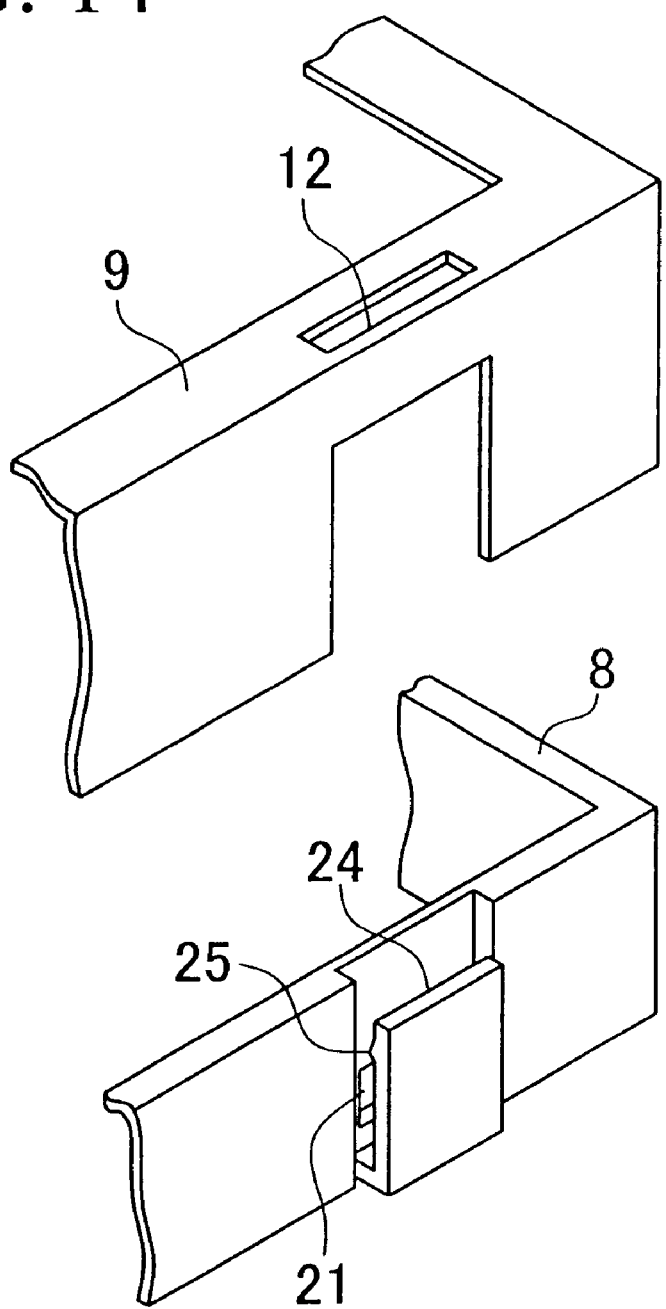
FIG. 14 is a drawing showing a fifth embodiment of the present invention, and is a perspective drawing showing the essential elements of the shielding frame and the chassis.
Figure 15B:
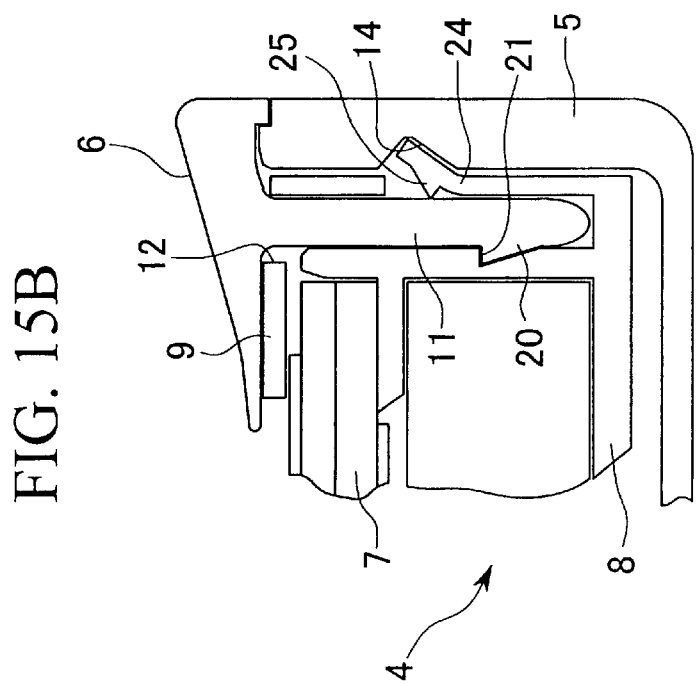
FIG. 15A and FIG. 15B are drawings for explaining the state showing the method of operating the retaining structure for assembling the display device.

In this embodiment, as shown in FIG. 14, a part of the shielding frame 9 at a location coinciding with the retaining structure of the liquid crystal module 4 is cut away, and a hook 24 is provided on the chassis 8. A projection 25 that projects towards the chassis side is provided on the distal end of the hook 24. Both the hook 24 and the projection 25 are integrally formed on the chassis 8. In addition, a spur 20 is formed on the projection 11 and a recess 21 is formed in the chassis 8.

Figure 15A:
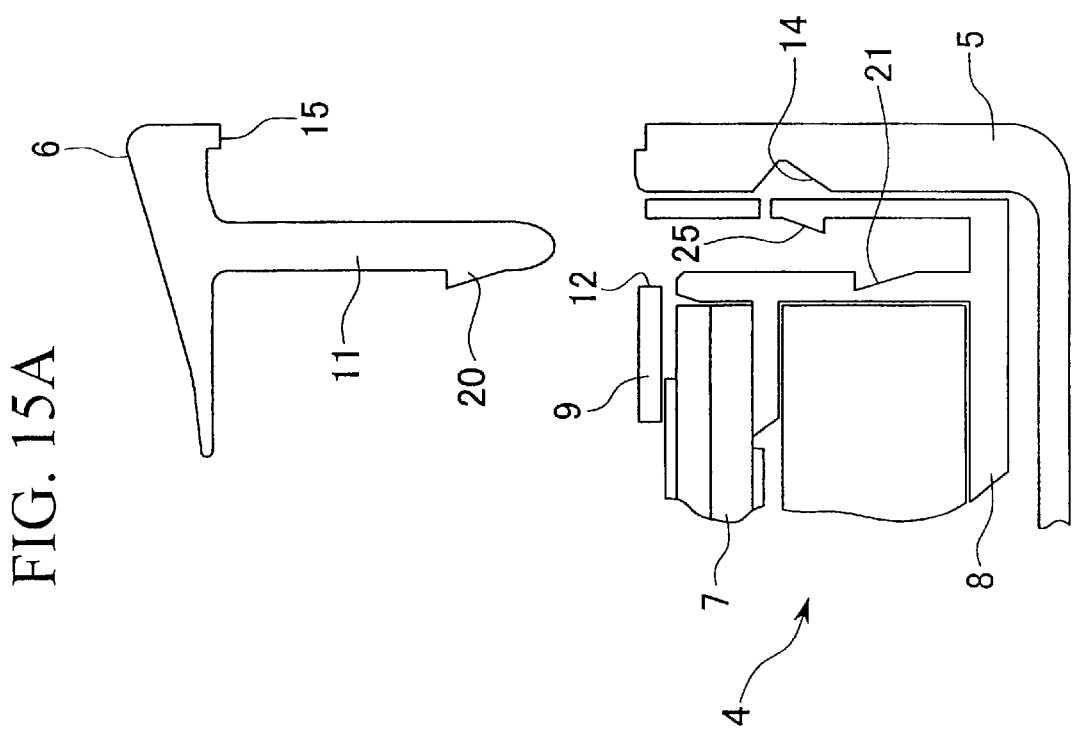
Figure 16A:
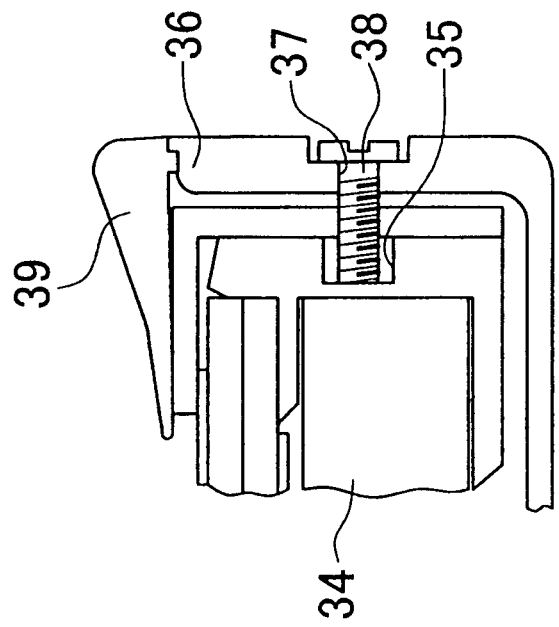
FIGS. 16A and 16B are cross-sectional drawings showing an example of the retaining structure that anchors the liquid crystal module to the body in a conventional display device.
Figure 16B:
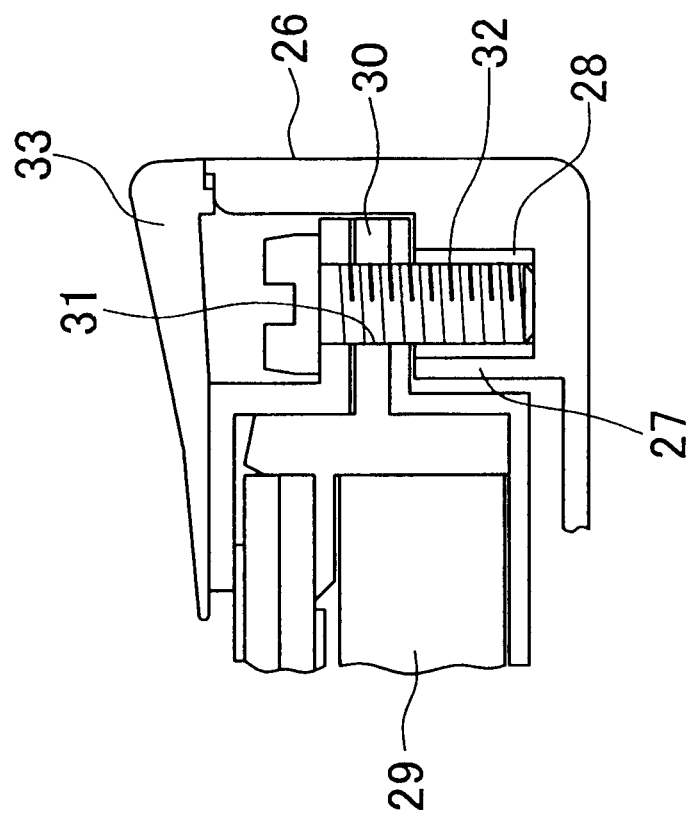

In the case of this embodiment, as shown in FIG. 15A, when the liquid crystal module 4 is disposed inside the back cover 5 and then the projection 11 is inserted in the hole 12 so that the front cover 6 is placed over and aligned with the back cover 5, the distal end of the projection 11 abuts the hook 24. When the projection is further inserted due to the resistance to the elasticity of the hook 24, as shown in FIG. 15B, the projection 25 is pressed against the side surface of the projection 11, the hook 24 is deformed towards the back cover 5 side, its distal end is fit into the recess 14, and at the same time, the spur 20 is fit into the recess 21 and engaged in the chassis 8 with the assistance of the repulsion of the hook 24.

The liquid crystal module 4 is anchored to the back cover 5 by the distal end of the hook 24 fitting into and engaging the recess 14, and the front cover 6 is anchored in the liquid crystal module 4 due to the projection 11 being sandwiched between the hook 13 and the chassis 8. Thereby, the retaining structure of the liquid crystal module 4 is a simple structure, and yet at the same time, has a high reliability.

In this embodiment, an example in which the hook 24 is integrally formed with the chassis 8 was described, but the hook 24, like the shield 9, can be produced from a metal material, and can be mounted separately on the chassis 8. In addition, in order to guarantee the shielding property, preferably a metal film is formed beforehand on the hook 24.

Above, each of the first through sixth embodiments were explained referring to the figures, but concrete structures are not limited to the content of each of the above-described embodiments, and design alterations can be made within a range that does not depart from the spirit of the invention.

In addition, in each of the above-described embodiments, the case in which the present invention is implemented on a note-type personal computer, but the present invention can be applied to other information terminal devices that use a display module including any type of liquid crystal module, such as a laptop-type personal computer, a mobile telephone, a mobile email terminal, or a portable GPS device.

In addition, the information terminal device according to the present invention may be applied not just to the portable information terminal device as described above, but to a stand-alone display monitor used with a desktop computer, or a flat panel display in a display monitor that hangs on a wall. Furthermore, as a display module, the present invention can be applied to a flat panel display other than a liquid crystal, such as a plasma display or an EL display.

As explained above, according to the first aspect of the present invention, a display module is anchored to the back cover by the hook engaging a recess, the front cover is anchored to the display module by sandwiching the projection between the hook and one part of the display module, and as a result the display module is anchored between the front cover and the back cover. Thereby, the installation of the display module can be simplified and the number of parts reduced. In addition, because screws are not used, as is the conventional case, the problems of scratches produced by the screws penetrating the display module and causing damage to the display performance can be avoided.

According to a second aspect of the display device, because both the display module and the back cover can be anchored by using the narrow space therebetween by providing a hook on the shielding frame, designing a thinner frame for the display device is possible.

According to a third aspect of the display device, by forming a hook by cutting a part of the shielding frame, the elasticity required for the hook can be guaranteed, and the integral formation of the members can be implemented. Thus, the production cost can be reduced.

According to a fourth aspect of the display device, the fist engagement part provided on the shielding frame engages the projection that is inserted in a hole, and thus the front cover is family anchored to shield cover, that is, the display module. Thereby, the retaining structure of the liquid crystal module 4 is a simple structure, and yet at the same time, has a high reliability.

According to a fifth aspect of the display device, the first engagement part provided at the location where the hook abuts the projection presses against the projection due to the pressing force of the hook, and thus the front cover is more firmly anchored to the display module. Thereby, the retaining structure of the liquid crystal module 4 is a simple structure, and yet at the same time, has a high reliability.

According to a sixth aspect of the display device, the first engagement part provided in the hole engages the projection, and thus the front cover is more firmly anchored in the display module. Thereby, the retaining structure of the liquid crystal module 4 is a simple structure, and yet at the same time, has a high reliability.

According to a seventh aspect of the display device, a first engagement part provided more forward in the insertion direction of the projection than the hook engages the projection, and thus the front cover is more firmly anchored to the display module. Thereby, the retaining structure of the liquid crystal module 4 is a simple structure, and yet at the same time, has a high reliability.

According to an eighth aspect of the display device, a second engagement part provided on the projection engages the liquid crystal module, and thus the front cover is more firmly anchored to the display module. Thereby, the retaining structure of the liquid crystal module 4 is a simple structure, and yet at the same time, has a high reliability.

According to a ninth aspect of the display device, a first roughened surface processed part provided on at least one of the projection or the hook increases the friction therebetween at locations where they abut, and thus front cover is more firmly anchored to the display module. Thereby, the retaining structure of the liquid crystal module 4 is a simple structure, and yet at the same time, has a high reliability.

According to a tenth aspect of the display device, a second roughened surface processed part provided between at least one of the hook and back cover increases the friction between the hook and back cover at locations where they abut, and thus the display module is more firmly anchored to the back cover. Thereby, the retaining structure of the liquid crystal module 4 is a simple structure, and yet at the same time, has a high reliability.

According to an eleventh aspect of the display device, the engagement part provided on the front cover engages with the back cover, and thus deforming of the back cover in the forward direction is prevented. Thereby the assembly precision of the display device can be improved.

According to a twelfth aspect of the display device, the retaining structures of the display module between both covers are disposed separated along the side edge of the display module, and thus the display module is more stably and firmly anchored between both covers. Thereby, the durability of the display device itself can be improved.

According to a thirteenth aspect of an information terminal device, by providing the display device disclosed on any of the first through third aspects, the installation of the display device is simplified and the number or parts reduced, and thus the production costs can be reduced. In addition, strength is exhibited towards shocks and a high durability can be attained.

What is claimed is:

1. A display device having a display module that is disposed and anchored between a front cover and a back cover, wherein:

a projection that projects towards said back cover is provided on said front cover;

a hole into which said projection is inserted when anchored between both of said covers is provided in said display module, and at the same time, a hook is provided that, while pressing said projection that is inserted into said hole, deforms towards said back cover due to the insertion of the projection; and a recess that engages said hook which is deformed by the insertion of said projection is provided on said back cover.

2. A display device according to claim 1 wherein said hook is provided on a shielding frame that forms said display module.

3. A display device according to claim 1, wherein said hook is formed by cutting a part of said shielding frame.

4. A display device according to claims 1, wherein a first engagement part that engages with said projection that has been inserted into said hole is formed on said shielding frame.

5. A display device according to claim 4 wherein said first engagement part is formed at a location where said hook abuts said projection.

6. A display device according to claim 4, wherein said first engagement part is provided in said hole.

7. A display device according to claims 4, wherein said first engagement part is provided more forward in the insertion direction of said projection than said hook.

8. A display device according to claims 1, wherein a second engagement part that engages said display module is provided on said projection.

9. A display device according to claims 1, wherein a first roughened surface processed part that increases the friction between said projection and said hook is provided at locations where one abuts the other is provided on at least one thereof.

10. A display device according to claims 1, wherein a second roughened surface processed part that increases the friction between said projection and said hook is provided at locations where one abuts the other on at least one thereof.

11. A display device according to claims 1, wherein an engagement part that engages with said back cover and prevents the deformation in the forward direction of the back cover is provided on said front cover.

12. A display device according to claims 1, wherein a plurality of retaining structures for said display module are provided between both covers using said projection, hole, hook, and recess, and said retaining structures are disposed separated along the side edge of said display module.

13. An information terminal device provided with the display device according to claims 1.

* * * * *